(12) United States Patent  
Wildner et al.

(10) Patent No.: US 9,338,639 B2  
(45) Date of Patent: May 10, 2016

(54) SYSTEMS AND METHODS FOR INTERACTING WITH PORTABLE ELECTRONIC DEVICES

(71) Applicant: HTC Corporation, Taoyuan, Taoyuan County (TW)

(72) Inventors: Bernhard Wildner, San Francisco, CA (US); William Travis Angle, Durham, NC (US); Rochus Emanuel Jacob, New York, NY (US); Gary Fitzgerald, Durham, NC (US); Gene Woo Nam, San Francisco, CA (US)

(73) Assignee: HTC CORPORATION, Taoyuan (TW)

( * ) Notice: Subject to any disclaimer, the term of this patent is extended or adjusted under 35 U.S.C. 154(b) by 142 days.

(21) Appl. No.: 13/899,836

(22) Filed: May 22, 2013

(65) Prior Publication Data

US 2013/0316690 A1 Nov. 28, 2013

Related U.S. Application Data

(60) Provisional application No. 61/650,993, filed on May 23, 2012.

(51) Int. Cl.
```
H04W 8/22      (2009.01)
H04B 1/3888    (2015.01)
H04B 1/3805    (2015.01)
```

(52) U.S. Cl.  
CPC .............. *H04W 8/22* (2013.01); *H04B 1/3888* (2013.01); *H04B 1/3805* (2013.01)

(58) Field of Classification Search  
CPC ..... H04W 24/04; H04W 12/06; H04W 12/02; H04W 12/04; H04W 8/22; G06F 1/1628; G06F 1/1633; G06F 1/1698; G06F 1/1626; G06F 1/1677; G06F 2200/1633; G06F 2200/1634; G06F 3/044; H04B 5/0025; H04B 5/0031; H04B 1/3888; H04B 1/38; H04B 1/38  
USPC .......................... 455/41.1–41.3, 575.8, 575.7  
See application file for complete search history.

(56) References Cited

U.S. PATENT DOCUMENTS

| | | | |
|---|---|---|---|
| 6,239,723 B1 | 5/2001 | Bauerschmidt et al. | |
| 2002/0106202 A1* | 8/2002 | Hunter | 396/56 |
| 2005/0026643 A1* | 2/2005 | White et al. | 455/550.1 |

(Continued)

FOREIGN PATENT DOCUMENTS

CN 1211351 A 3/1999

OTHER PUBLICATIONS

RFID (Radio Frequency Identification): Principles and Applications by Stephen A. Weis, dated 2007.*

(Continued)

*Primary Examiner* — Daniel Lai  
(74) *Attorney, Agent, or Firm* — McClure, Qualey & Rodack, LLP

(57) ABSTRACT

Systems and methods for interacting with a portable electronic device are provided. In this regard, a representative system includes: a cover sized and shaped for removable attachment to an exterior of the portable electronic device; a first antenna disposed on the cover; and a first wireless controller coupled to the first antenna and disposed on the cover and configured for transmitting a first data from the cover to the portable electronic device via the first antenna to identify the cover to the portable electronic device.

10 Claims, 4 Drawing Sheets

(56) References Cited

U.S. PATENT DOCUMENTS

| | | | |
|---|---|---|---|
| 2005/0075117 A1* | 4/2005 | Jang | 455/456.4 |
| 2006/0148454 A1* | 7/2006 | Welch | 455/414.1 |
| 2006/0187316 A1* | 8/2006 | Teramoto et al. | 348/231.3 |
| 2009/0039156 A1* | 2/2009 | Brandli et al. | 235/382 |
| 2011/0195761 A1* | 8/2011 | Lee | 455/575.4 |
| 2011/0250839 A1* | 10/2011 | Lee | 455/41.1 |
| 2011/0312270 A1* | 12/2011 | White | 455/41.1 |
| 2012/0315845 A1* | 12/2012 | Buczek | 455/41.1 |
| 2013/0169414 A1* | 7/2013 | Bellows et al. | 340/10.1 |
| 2013/0196597 A1* | 8/2013 | Aldana | H04B 5/0081 455/41.1 |

OTHER PUBLICATIONS

Office Action issued in corresponding Taiwan patent application (dated May 1, 2015).

Office Action issued in corresponding China patent application (dated Sep. 15, 2015).

* cited by examiner

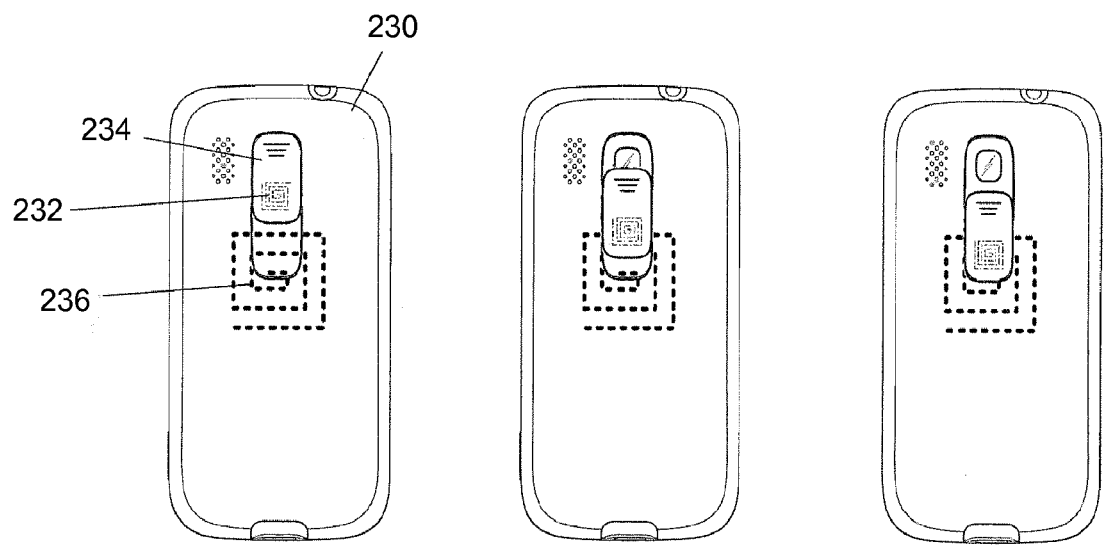
FIG. 7A   FIG. 7B   FIG. 7C
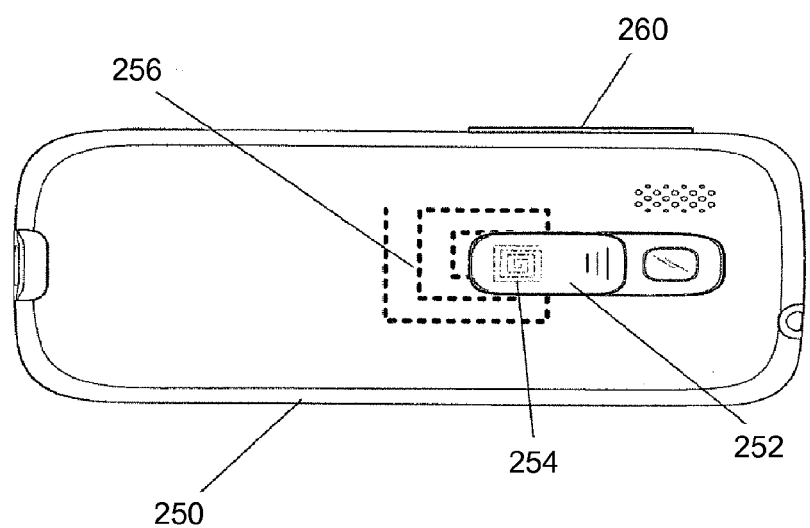
FIG. 8

SYSTEMS AND METHODS FOR INTERACTING WITH PORTABLE ELECTRONIC DEVICES

CROSS-REFERENCE TO RELATED APPLICATION

This application claims priority to U.S. Provisional application entitled "Systems and Methods for Interacting with a Cover/Carrying Solution and a Portable Electronic Device", having Ser. No. 61/650,993, filed May 23, 2012, which is incorporated by reference herein in its entirety.

TECHNICAL FIELD

The present disclosure generally relates to portable electronic devices.

BACKGROUND

Oftentimes, portable electronic devices (such as smartphones and tablet computers) may be easily damaged (for example, by a surface of the device being scratched). To remedy this problem, protective covers (sometimes referred to as a carrying solution) made from various types of materials are provided. Such a cover usually covers the back of an electronic device and may have an aperture to expose a portion of the device (such as to provide access to a camera lens). Notably, such a cover may also be used to alter the decorative appearance of the device.

SUMMARY

Systems and methods for interacting with portable electronic devices are provided. Briefly described, one embodiment, among others, is a system for interacting with a portable electronic device comprising: a cover sized and shaped for removable attachment to an exterior of the portable electronic device; a first antenna disposed on the cover; and a first wireless controller coupled to the first antenna and disposed on the cover and configured for transmitting a first data from the cover to the portable electronic device via the first antenna to identify the cover to the portable electronic device.

Another embodiment is a method for interacting with a cover and a portable electronic device comprising a processing unit, the method comprising: detecting, by the portable electronic device, first information stored in the cover attached to the portable electronic device; and
enabling a corresponding application of the portable electronic device in response to detection of the first information.

Still another embodiment is a portable electronic device having a tag reader system operative to alter operation of the portable electronic device responsive to detection of a tag carried by a cover of the portable electronic device.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 7A-7C are schematic diagrams of an example embodiment of a system, showing an example embodiment of a moveable component for repositioning a tag antenna.

FIG. 8 is a schematic diagram of another example embodiment of a system.

DETAILED DESCRIPTION

Figure 1:
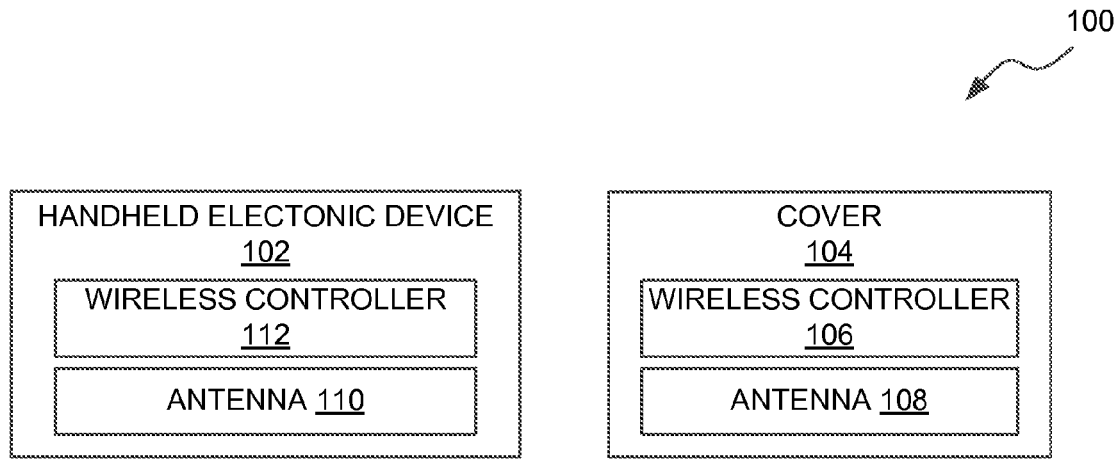
FIG. 1 is a schematic diagram of an example embodiment of a system.

Having summarized various aspects of the present disclosure, reference will now be made in detail to that which is illustrated in the drawings. While the disclosure will be described in connection with these drawings, there is no intent to limit the scope of legal protection to the embodiment or embodiments disclosed herein. Rather, the intent is to cover all alternatives, modifications and equivalents included within the spirit and scope of the disclosure as defined by the appended claims.

In this regard, systems and methods for interacting with portable electronic devices are provided. In some embodiments, interacting with a portable electronic device (e.g., a mobile phone, tablet computer, PDA) involves identifying a cover that is attached to the device. By way of wireless communication, radio communication or optical communication with the cover and portable electronic device for example, WiFi communication, Bluetooth communication, near field communication (NFC), Radio Frequency Identification (RFID), barcode, or other manners of identification associated with a cover may be used. Specifically, a tag using such a manner of identification may be placed or installed in a cover that is attached or otherwise affixed to the portable electronic device. The tag is identified by an associated reader resident on the portable electronic device. In response to detection of the tag, the device may activate a corresponding function. Thus, the cover alters a function of the portable electronic device.

FIG. 1 is a schematic diagram of an example embodiment of a system. As shown in FIG. 1, system 100 includes a portable electronic device 102 and a cover 104. The cover 104 is an accessory that is physically separate from the portable electronic device 102 and may be attached or mechanically installed on a side of the portable electronic device 102. The cover 104 incorporates a first wireless controller 106 and a first antenna 108 as a tag, with the first wireless controller 106 being able to communicate information (e.g., ID information) that identifies the cover 104 (such as by use of a unique identifier) or other stored information with the portable electronic device 102. The first antenna 108 propagates the information from the first wireless controller 106 to the portable electronic device 102. Notably, the first antenna 108 may be an NFC antenna and the first wireless controller 106 may be NFC controller.

Device 102 comprises a second antenna 110 and a second wireless controller 112. Based on proximity of the cover 104 to the device 102 (and, more specifically, the proximity of the first antenna 108 to the second antenna 110), the second wireless controller 112 receives information from the cover 104 or transmits information to the cover 104 as a reader or writer. In response to the information, the second wireless controller 112 may generate a signal for altering operation of the device 102. In some embodiments, one or more of various functions may be altered. By way of example, a button of the device may be repurposed to perform a different function than previously exhibited, a display may be changed or a disabled feature may be enabled, among possible others.

Figure 2:
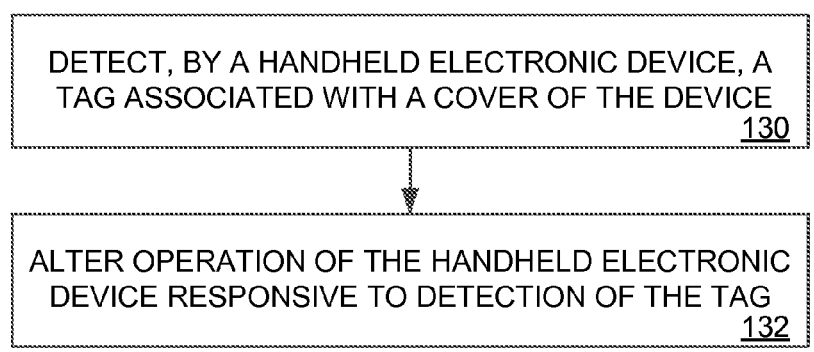
FIG. 2 is a flowchart depicting an example embodiment of a method for interacting with a portable electronic device.

FIG. 2 is a flowchart depicting an example embodiment of a method for interacting with a portable electronic device. As shown in FIG. 2, the method (which may be performed by an example tag reader system, for example), involves detecting a tag embedded in a cover of a portable electronic device (block 130). Please refer to FIG. 1. The tag may be an NFC tag, which has a NFC controller and a NFC antenna. The portable electronic device (usually a mobile phone) generates a magnetic field through the use of the second antenna 110 with the control of the second wireless controller 112 and the magnetic field induces an electric current in the first antenna 108 of the cover 102 which powers up the NFC controller. The NFC tag then creates a further magnetic field through the use the first antenna 108 with the control of the first wireless controller 106 which can in return be read by the second wireless controller 112 through the use of the second antenna 110. In block 132, operation of the portable electronic device 102 is altered or interrupted in response to detection of the tag in the cover 104.

Figure 3:
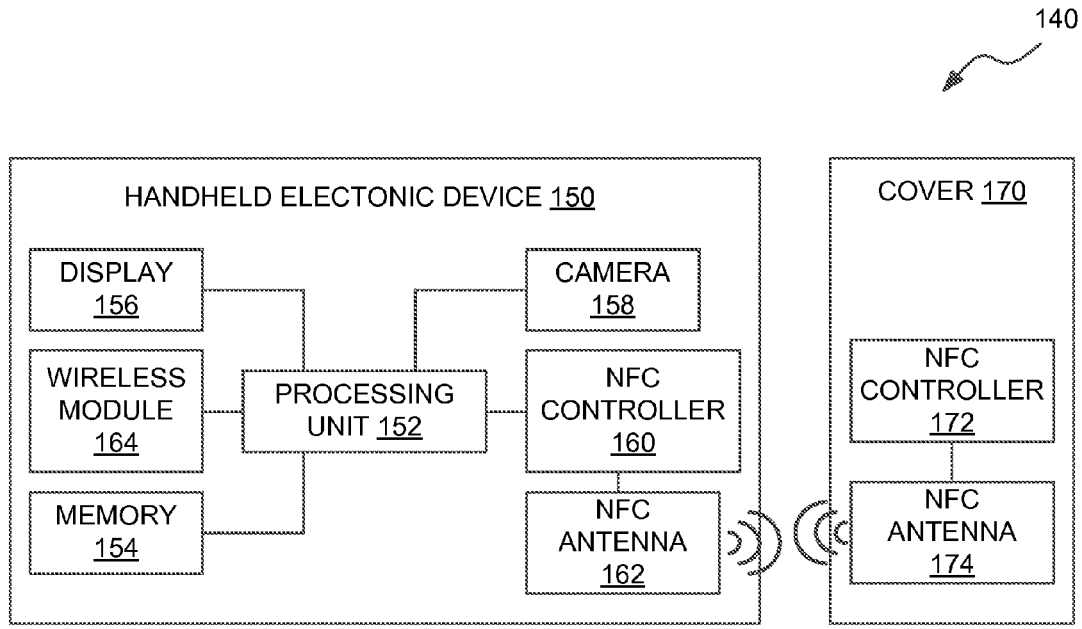
FIG. 3 is a schematic diagram of another example embodiment of a system.

FIG. 3 is a schematic diagram of another example embodiment of a system. As shown in FIG. 3, system 140 incorporates a device 150 and a cover 170. In particular, device 150 includes a processing unit 152, which is coupled to a storage unit such as a memory module 154, a display 156, a camera 158, an second NFC controller 160, a second NFC antenna 162 and wireless module 164. The cover 170 includes a first NFC controller 172 coupled to a first antenna 174.

It should be noted that, in some embodiments, the cover 170 may be a decorative/protective cover for the portable electronic device 150. As such, the cover 170 may be removably coupled to the backside of the device 150. Various covers may be embedded with different NFC tags for activating different functions on the portable electronic device 150. The user may choose a cover 170 from various covers and attach the chosen cover on the portable electronic device 150 for activation of a desired function on the portable electronic device 150 by the NFC tag embedded on the cover 170.

In operation, the wireless module 164 is used to connect to a network (e.g., a wireless and/or wired network). The wireless module 164 may use one or more of various configurations and/or protocols, such as WiFi, GSM, CDMA and GPRS, and 3G networks such as W-CDMA, EDGE or CDMA2000, as well as 4G networks such as LTE, LTE advance, or WiMAX, for example. Additionally, the wireless module 164 may store information obtained by the device from the network into the memory module 154.

The second NFC controller 160 couples with the second antenna 162 forming an NFC reader/writer and allows for close range communication with the first NFC controller 172 placed in the cover 170, and may comply with standards such as ISO 18092 or ISO 21481. The second NFC controller 160 may support three modes of operation—reader/writer, peer-to-peer, and card emulation. The different operating modes may be based on the ISO/IEC 18092 NFC IP-1 and ISO/IEC 14443 contactless smart card standards. In reader/writer mode, the second NFC controller 160 may be capable of reading NFC Forum-mandated tag types, such as a tag embedded in an NFC smart poster such as a cover of the portable electronic device 150. The reader/writer mode on the RF interface may be compliant with the ISO 14443 and FeliCa schemes. In Peer-to-Peer mode, the second NFC controller 150 and the first NFC controller 172 can exchange data. For example, Bluetooth or WiFi link set-up parameters can be shared and/or data such as virtual business cards or digital photos can be exchanged. Peer-to-Peer mode may be standardized on the ISO/IEC 18092 standard. In Card Emulation mode, the second NFC controller 160 may appear to an external reader much the same as a traditional contactless smart card. This enables contactless payments and ticketing by the second NFC controller 160 without changing the existing infrastructure. In some embodiments, the second NFC controller 160 may allow for close range communication at relatively high data rates (560 Mbps}, and may comply with the TransferJet protocol. Close range communication with the second NFC controller 160 may take place via magnetic field induction, allowing the second NFC controller 160 with second NFC antenna 162 to communicate with first NFC controller 172, which is carried by cover 170. The portable electronic device 150 generates a magnetic field through the use the second antenna 162 with the control of the second wireless controller 160 and the magnetic field induces an electric current in the first NFC antenna 174 of the cover which powers up the first NFC controller 172. Under control of the first NFC controller 172, the first NFC antenna 174 then creates a further magnetic field through the use the first NFC antenna 174 with the control of the first NFC controller 172 which can in return be read by the second NFC controller 160 through the use of the second NFC antenna 162. The second NFC controller 160 may be useful in establishing an initial communication link between the portable electronic device 150 and the cover 170. It should be noted that the second NFC controller 160 may be the primary communication link between the device 150 and the cover 170 or may merely allow an initial exchange of communication particulars (e.g., identifier, key, certificate and/or security code) so that a subsequent secure communication link may be established via a different mechanism, such as over a wireless LAN, cellular network or Bluetooth network, for example.

The second NFC controller 160 may store identity information such as IMEI, email, user information, security ID in the memory of the first wireless controller 172. The identity information written into the memory of the first wireless controller 172 may be used to identify the user or owner of the cover 170. The embedded data in the memory of the first wireless controller 172 may be read in close proximity to the device 150. In some embodiments, this may automatically launch an associated function (e.g., a service) according to the data read from the memory of the first wireless controller 172. Optionally, a user may be able to replace the content of the memory of the first wireless controller 172 with other data. The storage unit 154 on the portable electronic device 150 stores at least one set of data and each set of data has a pre-built identification code and a corresponding pre-assigned instruction. When the received data from the first wireless controller 172 matches the pre-built identification code, the processing unit enables or disables a corresponding application in response to the pre-assigned instruction. The pre-assigned instruction may be enabling the image sensor 158 on the portable electronic device 150 and changing the function of a button on the portable electronic device 170 to capture an image by using the image sensor 158 when the button is pressed.

The first NFC antenna 174 may be electrically coupled with the first NFC controller 172. The first NFC antenna 174 may receive NFC signals or electromagnetic signals for the first NFC controller 172 to process, and may transmit NFC signals or electromagnetic signals generated by the first NFC antenna 174. The first NFC controller 174 may store an identification code that indicates the type of cover (e.g., famous designer cover, special function cover) or communication particulars. The first NFC controller 174 may transmit this identification code to device 150.

In some embodiments, the NFC tag module is a passive NFC circuit. The first NFC controller 172 with the first NFC antenna 174 may work in a passive mode on a passive device (for example, integrated in a smart poster, such as the cover) that stores data that can be read by an NFC-enabled device such as the portable electronic device 150 with second NFC controller 160 and the second antenna 162. The passive NFC circuitry enables the second NFC controller 160 to obtain the data stored in a memory of the first NFC controller 172 as well as write data to the memory of the first NFC controller 172 without requiring cover 170 to supply any power to the first NFC controller 172. The magnetic field induces an electric current in the first antenna 174 of the cover 170 which powers up the first NFC controller 172. The first NFC controller 172 then creates a further magnetic field through the use the first antenna 174 which can in return be read by the second wireless controller 160 through the use of the second antenna 162. Alternatively, the first NFC controller 172 may be an active NFC circuit. Active NFC circuitry requires power system from the cover to provide data stored therein to the memory of the first NFC controller 172.

Memory 154 or the memory of the first NFC controller 172 may include one or more different types of memory, which may be used for performing device functions. For example, memory may include cache, Flash, ROM, RAM, or one or more different types of memory used for temporarily or permanently storing data. Memory 154 may be specifically dedicated to storing application or data received or downloaded from the Internet.

Figure 4:
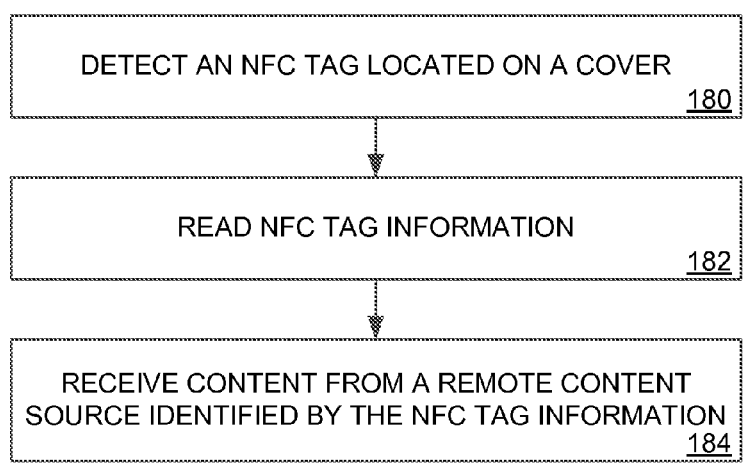
FIG. 4 is a flowchart depicting another example embodiment of a method for interacting with a portable electronic device.

FIG. 4 is a flowchart depicting an example embodiment of a method for interacting with a portable electronic device. As shown in FIG. 4, the process may be construed as beginning at block 180, in which a tag comprising a first wireless controller and first antenna located on a cover is detected. In some embodiments, this may involve a processing unit activating an associated second wireless controller that is operative for detecting tags. Notably, such a second wireless controller with a second antenna may be operative to read from and/or write to passive, active and/or semi-passive tags. The tag may be an RFID or NFC tag that can be wirelessly communicated. For example, the processing unit activates or enables the second wireless controller to read the tags when the user attaches the cover to the portable electronic device (block 182). The second wireless controller may generate a first radio frequency signal by using the second antenna to charge the passive tags that are placed in the cover. The first wireless controller receives the generated first radio frequency signal through the use of the first antenna. The first wireless controller responds to the generated first radio frequency signal by generating second radio frequency signals back to the second wireless controller by using the first antenna to generate electromagnetic signals. The second antenna receives the second radio frequency signals and transmitted to the second wireless controller. The first and second radio frequency signals may be encoded with data or information and may be decoded by the first or second wireless controller.

After receiving the information decoded from the second radio frequency signal from the first wireless controller, the portable electronic device may activate or enable a function or device based on the data received by the second antenna. In particular, in this embodiment, the portable electronic device may retrieve or download content information from a remote content source or server associated or identified by the information (block 184). By way of example, based on information (e.g. tag ID) or data (e.g. content identification information or content ID), downloadable content associated with the tag may be retrieved though the use of a wireless module. For example, the NFC reader/writer may read the tag information from the first wireless controller and pass the information to a processing unit. The processing unit sends the data that is obtained from the tag to a remote content source (e.g., a digital rights management service provider). The processing unit may utilize a secure channel (e.g. SSL link) through the wireless module to receive the desired content from the remote content source that has been identified by the data or information that is obtained from the tag.

In some embodiments, the portable electronic device may also connect with a designated web location using a URL stored in a storage unit of the first wireless controller. For example, this may be accomplished to obtain content from a service provider, with the content being, for example, an artist/song web page. As such, receiving media content in the form of audio and/or video media or other online service information may be performed in response to receiving information or data.

Additionally or alternatively, a portable electronic device may change various functions, such as the background, ring tone, skin color, and/or theme in response to receiving information from the first wireless controller. For example, when a cover is designed for a particular artist and has the NFC tag stored with related data associated to the particular artist, the portable electronic device may retrieve artist-related applications, ring tones, backgrounds, associated color skins and themes. Notably, the portable electronic device may automatically launch the associated services or function based on the data read from the NFC tag.

Figure 5:
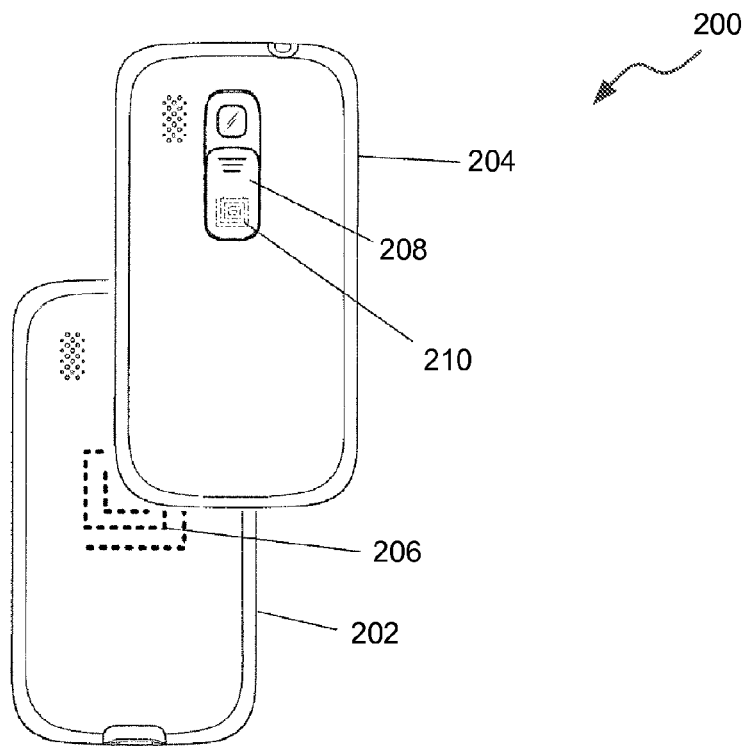
FIG. 5 is a schematic diagram of an example embodiment of a system, showing interaction of a portable electronic device and a device cover.

As another example, while the user attaches the cover to a portable electronic device, an NFC reader/writer may be activated before (or after) the cover is secured in position to read passive NFC tags. For instance, the NFC tag may be placed in moveable mechanism of the cover, such that the NFC tag may be moved in and out of the range of NFC reader/writer (such as depicted in FIG. 5). As an example, the first antenna or the first antenna with the first wireless controller may be placed on the moveable mechanism and is movable between a first position, which is detectable by the portable electronic device, and a second position, which is not detectable by the portable electronic device.

As shown in FIG. 5, system 200 includes a portable electronic device 202 and a cover 204. For device 202, a back of the device 202 is shown with an antenna 206 depicted in dashed lines. The cover includes a movable component 208. In this embodiment, component 208 is seated within a recess and is movable between the depicted position and another position (not depicted), in which the component is seated toward the top of the recess. Notably, the position shown corresponds to a detected position as this position place the carried antenna 210 in proximity to the antenna 206.

Figure 6:
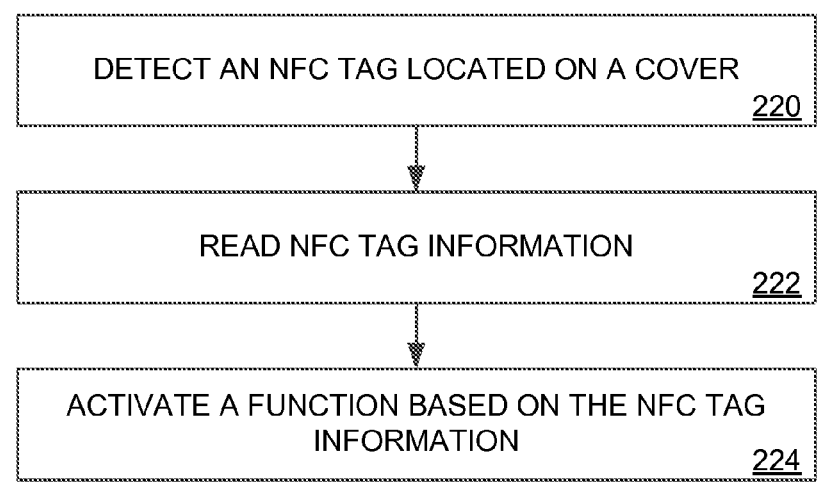
FIG. 6 is a flowchart depicting an example embodiment of a method for interacting with a portable electronic device.

In operation (and as shown in the flowchart of FIG. 6), once the cover 204 is attached to the device 202, if the user does not desire enabling the associated function, the NFC tag 210 is positioned toward the top of the recess (not shown in FIG. 5) so that a NFC reader/writer 206 of device 202 is unable to read the data in the NFC tag due to the fact that the NFC tag 210 is out of the range of NFC reader/writer 206. As user wants to activate or enable one or more functions or device (such as image sensor, camera, GPS, loudspeaker, user profile, for example), the user may adjust the component 208 so the NFC tag 210 may be in the range of detection of the NFC reader/writer 206 (block 220). Responsive thereto, the device may read the NFC tag information (block 222), and activate a function (e.g., automatically launch an associated service) based on the data read from the NFC tag 210 when the NFC tag 210 is detected by the NFC reader/writer 206 (block 224). As an example, the user wants to activate or enable the camera function and camera to take a picture, the user may adjust or move the movable component 208 from the first position which cover or block the light entering the camera to a second position that allows light enter the camera.

FIGS. 7A-7C are schematic diagrams of another example embodiment of a system, showing an example embodiment of a moveable component for repositioning a antenna. As shown in FIG. 7A, a device cover 230 includes an NFC tag 232 that is positioned at a disable position, at which an NFC reader/writer of an associated portable electronic device is unable to read the data in the NFC tag. Specifically, the NFC tag 232 is carried by a movable component 234 that, in the depicted position of FIG. 7A, is out of the range of NFC reader/writer. Notably, such a NFC reader/writer is associated with antenna 236 of the portable electronic device, and which is depicted in dashed lines.

In FIG. 7B, movement of the component 234 is depicted toward the position shown in FIG. 7C, in which the NFC tag 232 is in an enable position. Notably, moving the mechanism to the enable position places the NFC tag 232 in the range of detection of the NFC reader/writer. After the NFC tag 232 is detected by the NFC reader/writer, the device activates the camera function of the portable electronic device, for example).

FIG. 8 is a schematic diagram of another example embodiment of a system. As shown in FIG. 8, in which the back of a device is shown with an attached cover 250, a movable component 252 is provided that carries a tag 254. Component 252 is depicted in a detect position, in which a corresponding antenna 256 (in combination with other components of the device that are not shown in FIG. 8) is able to detect tag 254. In this embodiment, responsive to detecting of the tag 254, the device automatically launches a function, which alters operation of an actuator of the device. In this example, the actuator is a physical button 260; however, in other embodiments, the actuator may be a virtual key, for example. For instance, button 260 may be altered to function as a shutter button responsive to detection of the tag, while at other times this button may be the volume button for the device.

In some embodiments, a portable electronic device may incorporate a secondary sensor. In such an embodiment, responsive to the detection of an NFC tag, the secondary sensor may be activated to sense a condition of the device associated with user interaction. For example, the secondary sensor may be gravity sensor or accelerometer. Upon detection of the NFC tag, the device activates the camera function and the secondary sensor is used to sense the orientation of the device. The device may automatically adjust the orientation of the picture taken by the camera based on sensed condition by the secondary sensor.

In some embodiments, a secondary sensor may be active before detecting an NFC tag. For example, such a secondary sensor may be a capacitive sensor that detects whether or not the user is holding the device and then use that information to activate an associated reader for detecting a tag.

It should be noted that various functionality associated with the above-described embodiments may be implemented by hardware, software or combinations thereof. If embodied in software, it should be noted that each block depicted in the flowcharts may represent a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processing unit. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A system comprising:
    a portable electronic device;
    a cover sized and shaped for removable attachment to the portable electronic device, the cover having a movable component attached to an exterior thereof;
    a first antenna disposed on the cover and movable between a first position and a second position; and
    a first wireless controller coupled to the first antenna and disposed on the cover and configured to provide a first data via the first antenna to be wirelessly received by the portable electronic device for triggering a function of the portable electronic device, the first antenna and the first wireless controller are carried by the movable component to either the first position or the second position;
    wherein the portable electronic device comprises a second wireless controller, a processing unit coupled to the second wireless controller for triggering the function of the portable electronic device when the second wireless controller wirelessly receives the first data, a second antenna coupled to the second wireless controller, and a sensor coupled to the processing unit; and
    wherein the moveable component has a first end and a second end, the first wireless controller and the first antenna are disposed at the first end, when the moveable component is moved to a first position, the second wireless controller receives the first data via the second antenna from the first antenna, and when the moveable component is moved to a second position, the wireless controller does not receive the first data via the second antenna from the first antenna, and the second end of the moveable component is configured to block light entering the sensor.

2. The system of claim 1, wherein the first wireless controller is a near field communication (NFC) controller.

3. The system of claim 1, wherein triggering the function comprises enabling the sensor and executing a corresponding application for controlling the sensor when the processing unit receives the first data via the second wireless controller and the second antenna from the first wireless controller of the cover.

4. The system of claim 1, wherein the portable electronic device comprises a second storage unit coupled to the processing unit for storing at least one set of data, wherein each set of data comprises a pre-built identification code and a corresponding pre-assigned instruction associated with the pre-built identification code.

5. The system of claim 4, wherein the processing unit triggers the function in response to the pre-assigned instruction associated with pre-built identification code when the received first data matches to the pre-built identification code.

6. The system of claim 1, wherein the sensor is an image sensor.

7. The system of claim 1, wherein the cover further comprises a first storage unit coupled to the first wireless controller and storing the first data.

8. The system of claim 1, wherein the system further comprises a remote content source; and the portable electronic device further comprises a wireless module coupled to the processing unit and configured to communicate with the remote content source to retrieve information corresponding to the first data received by the portable electronic device.

9. The system of claim 1, wherein the portable electronic device further comprises a switch coupled to the processing unit and generating a trigger signal and the processing unit receives the trigger signal and enables a first function when the portable electronic device receives the first data and the processing unit receives the trigger signal and enables a second function when the portable electronic device does not receives the first data.

10. A system for interacting with a portable electronic device, the portable electronic device comprising a second wireless controller, a processing unit coupled to the second wireless controller, a second antenna coupled to the second wireless controller, and a sensor coupled to the processing unit, the system comprising:
a cover sized and shaped for removable attachment to the portable electronic device, the cover having a movable component attached to an exterior thereof;
a first antenna disposed on the cover and movable between a first position and a second position; and
a first wireless controller coupled to the first antenna and disposed on the cover and configured to provide a first data via the first antenna to be wirelessly received by the portable electronic device for triggering a function of the portable electronic device, the first antenna and the first wireless controller are carried by the movable component to either the first position or the second position;
wherein the processing unit is operative to trigger the function of the portable electronic device when the second wireless controller wirelessly receives the first data; and
wherein the moveable component has a first end and a second end, the first wireless controller and the first antenna are disposed at the first end, when the moveable component is moved to a first position, the second wireless controller receives the first data via the second antenna from the first antenna, and when the moveable component is moved to a second position, the wireless controller does not receive the first data via the second antenna from the first antenna, and the second end of the moveable component is configured to block light entering the sensor.

* * * * *